(12) United States Patent
Ghods et al.

(10) Patent No.: US 8,140,513 B2
(45) Date of Patent: Mar. 20, 2012

(54) METHODS AND SYSTEMS FOR OPEN SOURCE COLLABORATION IN AN APPLICATION SERVICE PROVIDER ENVIRONMENT

(75) Inventors: Sam Ghods, San Francisco, CA (US); Florian Jourda, Pollionnay (FR)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/030,090

(22) Filed: Feb. 17, 2011

(65) Prior Publication Data

US 2011/0209118 A1    Aug. 25, 2011

Related U.S. Application Data

(63) Continuation of application No. 12/260,533, filed on Oct. 29, 2008.

(60) Provisional application No. 60/992,656, filed on Dec. 5, 2007, provisional application No. 61/055,901, filed on May 23, 2008.

(51) Int. Cl.
    *G06F 17/30* (2006.01)
(52) U.S. Cl. ....................................................... 707/706
(58) Field of Classification Search .............. 707/3, 204, 707/706; 709/217
    See application file for complete search history.

(56) References Cited

U.S. PATENT DOCUMENTS

| | | | |
|---|---|---|---|
| 5,999,908 A | 12/1999 | Abelow | |
| 6,289,345 B1 | 9/2001 | Yasue | |
| 6,584,466 B1 | 6/2003 | Serbinis et al. | |
| 6,636,872 B1 * | 10/2003 | Heath et al. ............................ | 1/1 |
| 7,069,393 B2 * | 6/2006 | Miyata et al. ................. | 711/145 |
| 7,133,834 B1 | 11/2006 | Abelow | |
| 7,149,787 B1 * | 12/2006 | Mutalik et al. ................ | 709/217 |
| 7,222,078 B2 | 5/2007 | Abelow | |
| 7,275,244 B1 | 9/2007 | Bell et al. | |
| 7,620,565 B2 | 11/2009 | Abelow | |
| 2003/0093404 A1 | 5/2003 | Bader et al. | |

(Continued)

FOREIGN PATENT DOCUMENTS

KR    20020017444 A    3/2002

(Continued)

OTHER PUBLICATIONS

U.S. Appl. No. 60/992,656, filed Dec. 5, 2007, Methods and Systems for Open Source Collaboration in an Application Service Provider Environment.

(Continued)

*Primary Examiner* — Etienne Leroux
(74) *Attorney, Agent, or Firm* — Perkins Coie LLP (57) ABSTRACT

A system and method for integrating a plurality of web-based applications with a web-based file management system. The web-based application may provide a service to the users of the web-based file management system, such that the web-based application can interact with the files of said users. The integration of the service of the web-based application with the web-based file management system is achieved through a simple web interface to configure the service, without the developer of the web-based application having to change the application programming interface (API) of the application. The user of the web-based file management system may add services of a plurality of available web-based applications and use these services with one or more files that are stored on the web-based file management system.

18 Claims, 11 Drawing Sheets

U.S. PATENT DOCUMENTS

| | | | |
|---|---|---|---|
| 2004/0128359 A1 | 7/2004 | Horvitz et al. | |
| 2004/0246532 A1 | 12/2004 | Inada | |
| 2005/0005276 A1 | 1/2005 | Morgan | |
| 2005/0050228 A1 | 3/2005 | Perham et al. | |
| 2005/0114378 A1 | 5/2005 | Elien et al. | |
| 2006/0053088 A1 | 3/2006 | Ali et al. | |
| 2006/0174051 A1 | 8/2006 | Lordi et al. | |
| 2006/0174054 A1 | 8/2006 | Matsuki | |
| 2006/0265719 A1 | 11/2006 | Astl et al. | |
| 2007/0126635 A1 | 6/2007 | Houri | |
| 2007/0214180 A1 | 9/2007 | Crawford | |
| 2007/0283443 A1* | 12/2007 | McPherson et al. | 726/26 |
| 2008/0077631 A1* | 3/2008 | Petri | 707/204 |
| 2008/0133674 A1* | 6/2008 | Knauerhase et al. | 709/206 |
| 2008/0151817 A1* | 6/2008 | Fitchett et al. | 370/329 |
| 2009/0132651 A1 | 5/2009 | Roger et al. | |
| 2009/0150417 A1 | 6/2009 | Ghods et al. | |
| 2010/0036929 A1 | 2/2010 | Scherpa et al. | |

FOREIGN PATENT DOCUMENTS

| | | | |
|---|---|---|---|
| KR | 20060070306 A | 6/2006 | |
| KR | 20060114871 A | 11/2006 | |
| WO | WO-2006028850 A2 | 3/2006 | |

OTHER PUBLICATIONS

U.S. Appl. No. 61/055,901, filed May 23, 2008, Methods and Systems for Open Source Collaboration in an Application Service Provider Environment.

U.S. Appl. No. 12/260,533, filed Oct. 29, 2008, Web-Based File Management System and Service.

U.S. Appl. No. 61/434,810, filed Jan. 20, 2011, Real Time Notifications of Activity and Real-Time Collaboration in a Cloud-Based Environment with Applications in Enterprise Settings.

U.S. Appl. No. 61/445,490, filed Feb. 20, 2011, Real Time Notifications of Activity and Real-Time Collaboration in a Cloud-Based Environment with Applications in Enterprise Settings.

U.S. Appl. No. 13/152,982, filed Jun. 3, 2011, Real Time Notification of Activities that Occur in a Web-Based Collaboration Environment.

U.S. Appl. No. 13/166,733, filed Jun. 22, 2011, Multimedia Content Preview Rendering in a Cloud Content Management System.

U.S. Appl. No. 61/506,013, filed Jul. 8, 2011, Collaboration Sessions in a Workspace on a Cloud-Based Content Management System.

U.S. Appl. No. 13/208,615, filed Aug. 12, 2011, Collaboration Sessions in a Workspace on a Cloud-Based Content Management System.

U.S. Appl. No. 61/538,782, filed Sep. 23, 2011, Central Management and Control of User-Contributed Content in a Web-Based Collaboration Environment and Management Console Thereof.

U.S. Appl. No. 13/165,725, filed Jun. 21, 2011, Batch Uploading of Content to a Web-Based Collaboration Environment.

U.S. Appl. No. 61/505,999, filed Jul. 8, 2011, Desktop Application for Access and Interaction with Workspaces in a Cloud-Based Content Management System and Synchronization Mechanisms Thereof.

U.S. Appl. No. 13/152,982, filed Jun. 3, 2011, Ghods et al.

U.S. Appl. No. 13/165,725, filed Jun. 21, 2011, Trombley-Shapiro et al.

U.S. Appl. No. 13/166,733, filed Jun. 22, 2011, Seibert et al.

U.S. Appl. No. 13/208,615, filed Aug. 12, 2011, Lee et al.

International Search Report PCT/US2008/012973 dated Apr. 30, 2009, pp. 1-3.

Supplementary European Search Report European Application No. EP 08 85 8563 dated Jun. 20, 2011 pp. 1-5.

Written Opinion PCT/US2008/012973 dated Apr. 30, 2009, pp. 1-4.

U.S. Appl. No. 13/274,268, filed Oct. 14, 2011, Savage.

U.S. Appl. No. 13/282,427, filed Oct. 26, 2011, Goldberg.

International Search Report and Written Opinion for PCT/US2011/039126 mailed on Oct. 6, 2011, pp. 1-13.

* cited by examiner

Home   My Files   Updates   Collaborators   Services

You are currently in developer mode. Return to OpenBox as regular user.
View the OpenBox documentation or contact us for questions or bug reports.

Step 1. Create an OpenBox Service ?

OpenBox enables Box.net users to send their data to and from your web or software application, or service. By using our simple API, you can be accepting data from Box users in no time. Please complete the following details to start using the OpenBox platform.

General Information:

| | | |
|---|---|---|
| Service name: | [        ] | Ex: Zoho |
| Service Description: | [        ] | Ex: Zoho is an online productivity suite |
| Support email: | [        ] | Ex: support@zoho.com |
| Website URL: | [        ] | Ex: http://zoho.com |
| URL of service description page: | (will be generated once service is saved) | Page that will show the detail of this service to Box users. You can link to it from your website |
| Display in public service directory: | ◉ No<br>○ Yes (pending Box.net approval) | If displayed in the public directory, your service will be visible to all Box users. Otherwise, it will be accessible only to users that know the service description page url. |

Trademark Images of the service:

| | | |
|---|---|---|
| Logo: | No logo uploaded | Displayed in services directory |
| Upload new logo: | [        ] Browse... | Will be resized to 100x80 |
| Favicon: | No favicon uploaded | Displayed in front of every action of the service, notably in drop down menu of files |
| Upload new favicon: | [        ] Browse... | Will be resized to 16x16 (.Ico not accepted) |

Screenshots of the service:

| | | |
|---|---|---|
| Upload new screenshot: | [        ] Browse... | Will be resized to 570x570 |
| Add a description to new screenshot: | [        ] | |

Developers that can edit this service:

1. NTraitler@perkinscoie.com

| | | |
|---|---|---|
| Add a developer: | [        ] | Email of a Box user that will be granted right to edit this service (limited to 5 people) |

Backend parameters:

| | | |
|---|---|---|
| Api Key: | (will be generated once service is saved) | Common api key for all actions Used to access Box.net APIs |

Service actions: ?

No action created
(you will be able to create new actions once service is saved)

Continue     Cancel

*FIG. 10*

Home   My Files   Updates   Collaborators   Services

You are currently in developer mode. Return to OpenBox as regular user.
View the OpenBox documentation or contact us for questions or bug reports.

Step 2. Create an OpenBox Action

OpenBox enables Box.net users to send their data to and from your web or software application, or service. By using our simple API, you can be accepting data from Box users in no time. Please complete the following details to start using the OpenBox platform.

General Information: ?

Name: [_______]   Ex: Edit with Zoho

Description: [_______]   Ex: Open your document with Zoho Writer

Supported Extensions: [_______]   Ex: doc, png, gif, gmp
Leave empty to accept all files
→ • Read permissions are enough
• Full permissions are required

Permissions requirement: [Read permissions are ▼]   If Read permissions are enough (ie download only) then the action will be available on shared pages too

Category: [Previewing ▼]   Displayed in the service directory
→ • Previewing
• Editing
• Converting
• Sharing
• Publishing
• Productivity
• Fun
• Communication
• Printing

Filetype Category: [All Files ▼]   Displayed in the service directory

Action Status:
◉ Development (visible and executable only by the developers)
○ Online (visible and executable by all users of the action)
○ Maintenance (visible by all users of the action, but executable only by the developers)

→ • All files
• Documents
• Images
• Audio
• Video
• Miscellaneous

Prompt parameters: ?

Prompt message: [_______]   Ex: Your file will be open by Zoho editor

| Data type | Parameter name | Label | Default value | Remember | |
|---|---|---|---|---|---|
| String ▼ | popup_param | Label 0 | default value 0 | Yes ▼ | delete |
| add prompt parameter | | | add section break | | |

→ • String
• Password
• Textarea
• Radio
• Drop Down

Callback configuration: ?

User experience:
◉ Your action will open a popup
○ Your action will run server-side only

Method:
◉ REST
○ XML
○ SOAP
Type of HTTP request that will be made to your server

Initial Callback URL: [_______]   URL for the initial HTTP request (probably url to one of your API functions)

| Method | Parameter name | Parameter value | |
|---|---|---|---|
| Get ▼ | | | delete |
| add callback parameter | | | |

→ • Get
• Post
• File

Authentication: ?

Do you need HTTP Basic Authentication?
○ No
◉ Yes
If basic access authentication is needed, you will be able to choose login and password

Save new action        Cancel

*FIG. 11*

METHODS AND SYSTEMS FOR OPEN SOURCE COLLABORATION IN AN APPLICATION SERVICE PROVIDER ENVIRONMENT

RELATED APPLICATIONS

This application is a Continuation of and claims the benefit of priority under 35 U.S.C. 120 to U.S. patent application Ser. No. 12/260,533, filed on Oct. 29, 2008, entitled "METHODS AND SYSTEMS FOR OPEN SOURCE COLLABORATION IN AN APPLICATION SERVICE PROVIDER ENVIRONMENT,", filed by Sam Ghods, et al, which application claims the benefit of U.S. Provisional Application No. 61/055,901 filed on May 23, 2008, entitled METHODS AND SYSTEMS FOR OPEN SOURCE INTEGRATION" by inventor Sam Ghods, which application claims the benefit of U.S. Provisional Application No. 60/992,656 filed Dec. 5, 2007, entitled "METHODS AND SYSTEMS FOR OPEN SOURCE COLLABORATION IN AN APPLICATION SERVICE PROVIDER ENVIRONMENT" by Florian Jourda, et al; all of which applications are incorporated herein by reference in their entirety.

BACKGROUND

A server, or service class computing device, may be used to store files and to provide a website interface for one or more users of this website to access the files. An application developer may wish to make a service available to users of the website. This would allow the users to use the developer's application with the users' files.

In implementing a developer's service through an external website, one approach taken has been for the developer to make alterations to the application programming interface (API) of the software providing the service in order to enable the external software to communicate with the API of the developer's service. Significant resources and time may be required to implement the service through the external website by changing the API of the application providing the service. The developer is typically required to modify the API in a specific way to enable the application to send and accept data to and from the external application.

A provider of a website for file storage, sharing and collaboration may wish to make a plurality of services available to the users. Such users can then access the plurality of services from a single location to use with their files. The provider of the website may therefore wish to facilitate integration of services with its website.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique provides an API-agnostic method and system for integrating a web-based file management system with one or more web-based applications to allow users of the web-based file management system to use the web-based application with files stored on the web-based file management system.

A system based on the technique may include a server storing one or more files of one or more users and providing a website for software developers to integrate their application with the website. This would make the application available to users of the website to use with the files stored on the web-based file management system.

A method based on the technique may include transmitting files from the web-based file management system to the web-based application along with a command structure of the API of the web-based application.

An integration engine allows a web-based file management system to provide an interface for an application developer to integrate a service in the web-based file management system, advantageously without the developer having to alter an API of the application providing the service. The integration engine acts as an intermediate between the web-based file management system and the web-based application, allowing them to communicate between each other.

A configuration interface on the web-based file management system provides a way for the developer to set up a service that acts on one or more files of a user of a web-based file management system, upon request of the user. The configuration parameters are stored on the web-based file management system and used whenever the service is requested by a user of the web-based file management system to act on a file stored on the web-based file management system.

A user interface allows a user of a web-based file management system to send, edit or view files that are stored on the web-based file management system with an external application.

BRIEF DESCRIPTION OF THE DRAWINGS

FIG. 10 depicts an example of a configuration interface, wherein a developer can enter values for a set of parameters to create a service.

FIG. 11 depicts an example of a configuration interface, wherein a developer can enter values for a set of parameters to create an action.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

A technique provides integration between a computer system storing files, a web based file management system (WBFMS), and a web based application (WBA). The WBA is operable to modify a file, perform another action with the file, or provide some other service. An application developer configures the WBA through an interface to integrate a service into the WBFMS to use the WBA, advantageously, without the application developer having to alter an application programmer interface (API) of the WBA.

An application programming interface (API) may be defined as a set of instructions programmable to cause a WBA to respond to one or more commands. An application or an individual may provide commands in accordance with the API to cause the WBA to perform an action.

To "send a file" includes at least one of the following and may include a combination of the following: send a copy of a file, send an indirection, link, or pointer to the file, send information about the file, or send a part or parts of the file.

Figure 1:
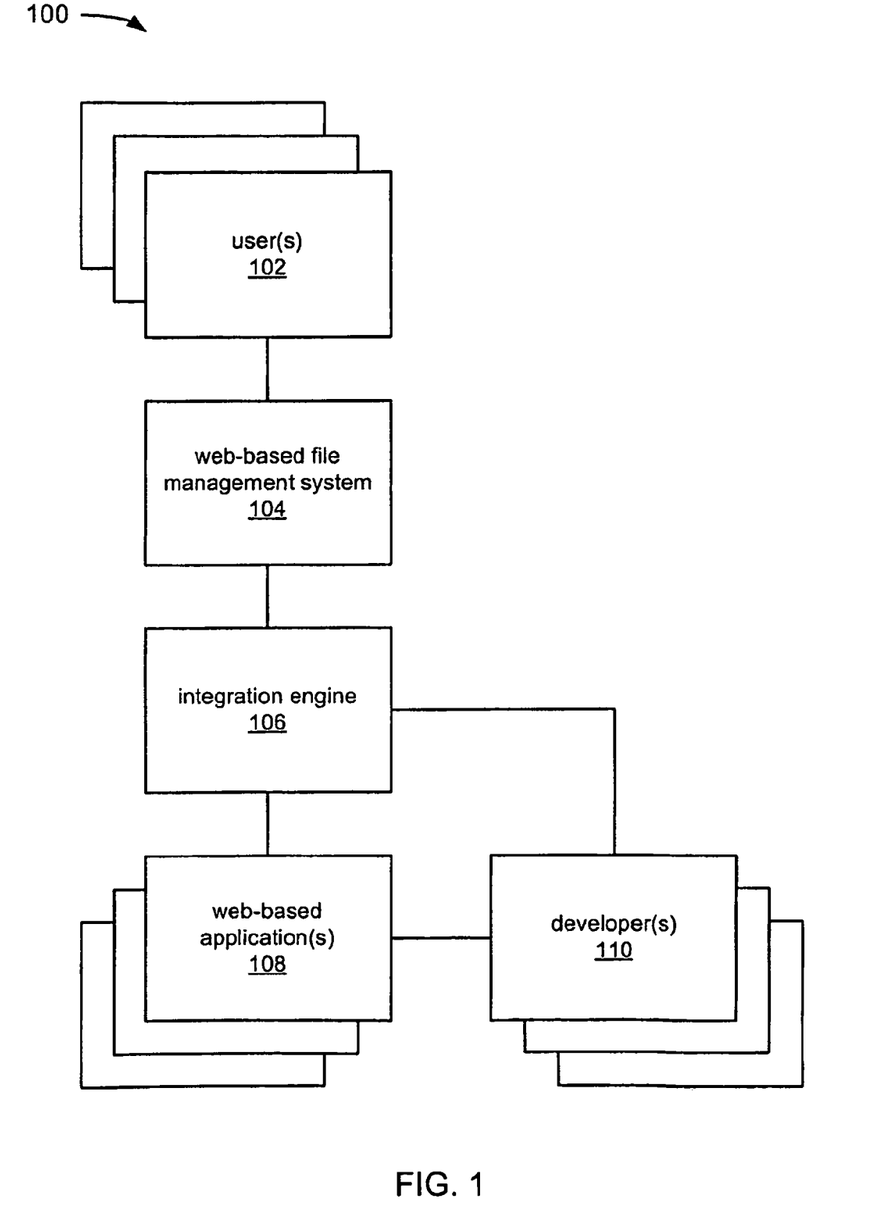
FIG. 1 depicts an example of a system for integrating a web-based file management system (WBFMS) with a web-based application (WBA).

FIG. 1 depicts a diagram 100 of an example of a method for API-agnostic integration of two software providers. FIG. 1 includes user(s) 102, web-based file management system (WBFMS) 104, integration engine 106, web-based application (WBA) 108 and developer(s) 110.

In the example of FIG. 1, the user 102 may be an individual or machine acting on behalf of an individual, having access to the internet through a computing device. As an individual, the user 102 may use an internet browser window, such as Internet Explorer or Mozilla Firefox to access the internet.

In the example of FIG. 1, the WBFMS 104 may provide online storage where users of the WBFMS 104 can store their files. The WBFMS 104 may also provide for file sharing and collaboration among users, as well as application services provided locally. The WBFMS 104 may include any computer readable medium capable of storing data. The WBFMS 104 may provide a user interface through which users can access and manage files stored on the WBFMS 104.

In the example of FIG. 1, the integration engine 106 includes a processor executing instructions operable to provide commands to a WBA 108. The integration engine 106 may include an interface for configuring one application to work with the other.

In the example of FIG. 1, the WBA 108 may be software providing services to users through the internet. These services may, in a non-limiting example, include modifying or viewing a file or sending it via fax.

In the example of FIG. 1, the developer(s) 110 may be an individual, organization, or machine acting on behalf of an individual or organization, involved in the development process of an application. The developer(s) 110 may have knowledge of the API of the application.

The user 102 may access the WBFMS 104 via a computing device connected to the internet. The WBFMS 104 may provide online storage wherein users can store files. The user 102 may then upload files to the WBFMS 104 or view files already stored on the WBFMS 104. Files stored on the WBFMS 104 may be used with the WBA 108 via an integration engine 106. The developer(s) 110 are connected to the WBA 108 and to the integration engine 106. The developer(s) 110 may configure the integration engine 106, such that the WBA 108 can integrate with the WBFMS 104, without having to change the API of the service provided by the WBA 108. Integration will be discussed in further detail below, however, as a limited introduction, such configuration typically includes transmitting commands to the integration engine 106 for the integration engine 106 to provide to the WBA 108 along with a file. Upon a request from the user 102 of the WBFMS 104, the integration engine 106 sends the requested file along with a command structure of the API of the WBA 108 to the WBA 108.

Figure 2:
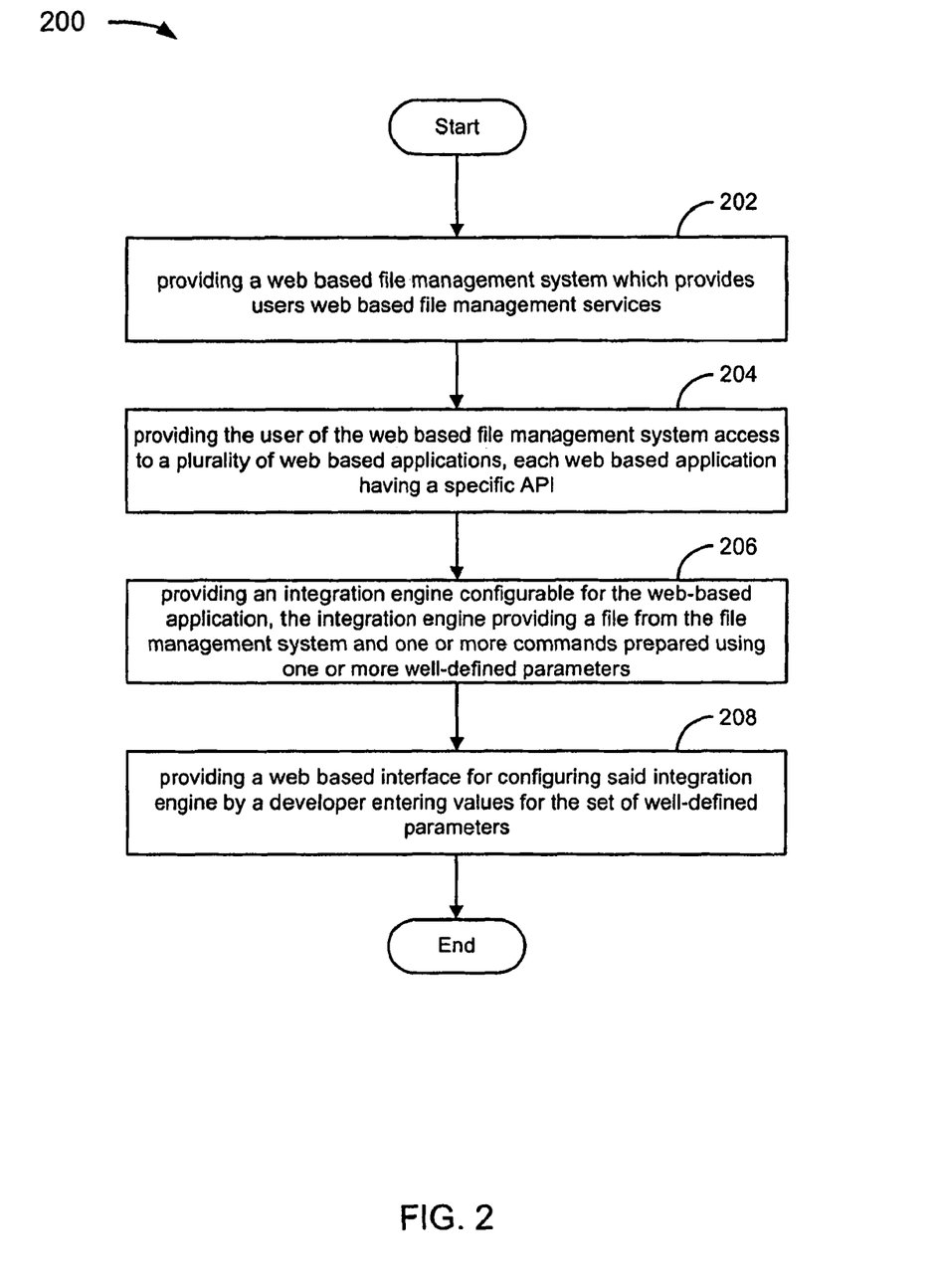
FIG. 2 depicts an example of a flowchart of an API-agnostic method for providing a plurality of WBAs to a user of a WBA.

FIG. 2 depicts an example of a flowchart of an API-agnostic method for providing a plurality of WBAs to a user of a WBA.

In the example of FIG. 2, the flowchart starts at module 202 with providing a web based file management system which provides users web-based file management services. These services may include storing files and providing access to these files to users of the WBFMS.

In the example of FIG. 2, the flowchart continues to module 204 with providing the user of the web-based file management system access to a plurality of web-based applications, each web-based application having a specific API. These WBAs may be used on files stored on the WBFMS and may, in a non-limiting example include modifying or viewing the file.

In the example of FIG. 2, the flowchart continues to module 206 with providing an integration engine configurable for the web-based application, the integration engine providing a file from the file management system and one or more commands prepared using one or more well-defined parameters.

In the example of FIG. 2, the flowchart continues to module 208 with providing a web-based interface for configuring the integration engine by a developer entering values for the set of well-defined parameters. Having provided a web-based interface, the flowchart terminates.

Figure 3:
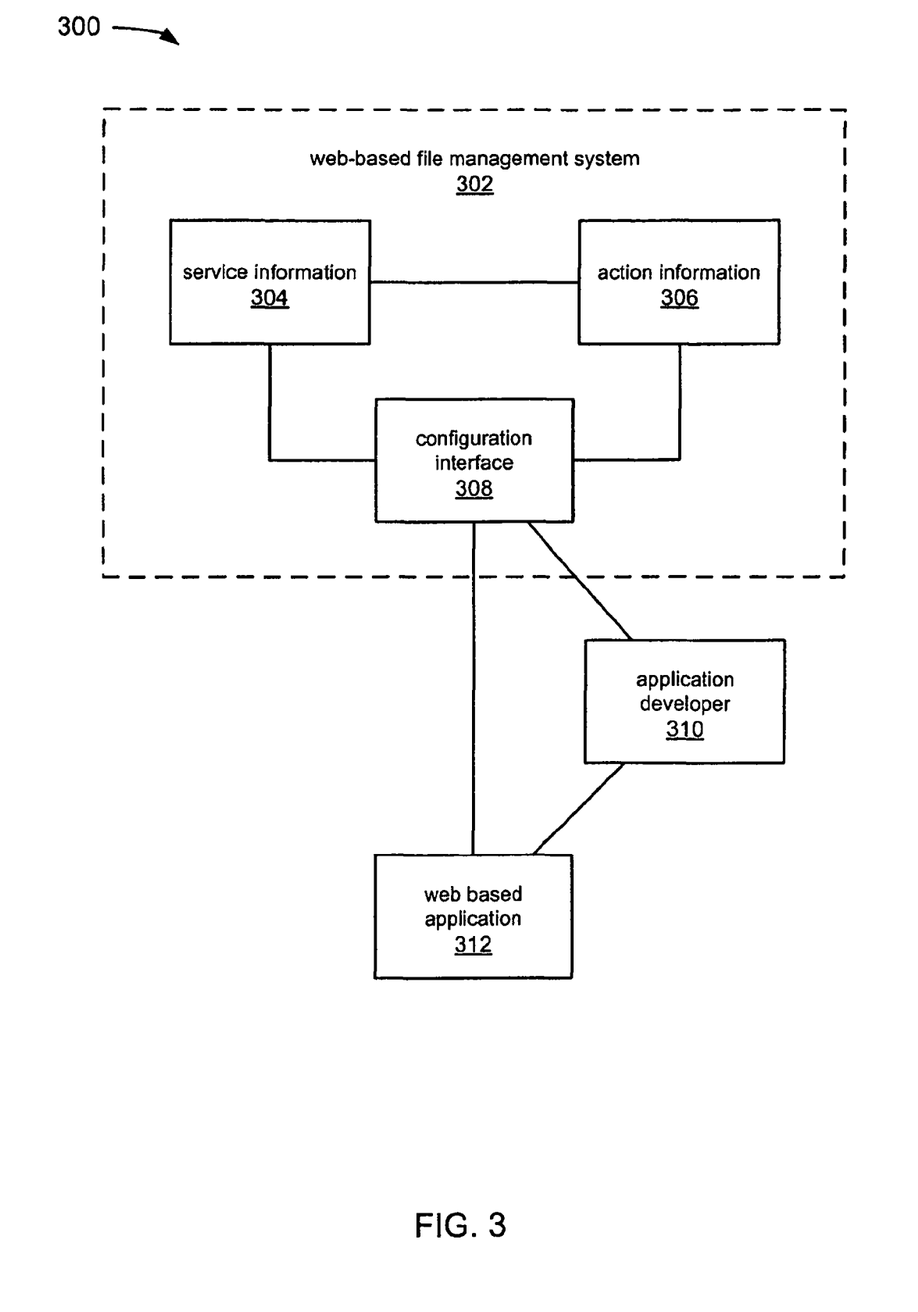
FIG. 3 depicts an example of a system allowing a developer of a web-based application to integrate a service and an action with a web-based file management system through an interface of the web-based file management system.

FIG. 3 depicts an example of a system 300 allowing a developer of a web-based application (WBA) to integrate a service and an action with a web-based file management system through an interface of the web-based file management system (WBFMS).

In the example of FIG. 3, WBFMS 302 includes service information 304, action information 306, and configuration interface 308.

In the example of FIG. 3, the service information 304 may include, but is not limited to, any combination of the following: the name of the service, a description, email contact information for support, a URL to the service description page, access control parameters, one or more pictures identifying the service, and an API key.

The API key is generated by the WBFMS 302 and is used for all actions of the WBA 312 that access the API of the WBFMS 302. In a non-limiting example, the WBA 312 can perform the following functions using the API of the WBFMS 302: store and retrieve files from the WBFMS 312, organize files into folders, move, rename or delete files, and share files.

The access control parameters may define whether the service defined by the service information 304 is visible to all users of the WBFMS 302 (e.g., via a user searchable service directory), or whether it is only accessible to users that know the URL of the service description page.

In the example of FIG. 3, the action information 306 may include, but is not limited to, any combination of the following: a name of the action, a description, a list of supported file extensions, permission information, a command language, a command address, a command response address, one or more commands, and a security parameter.

The permission information defines the availability of an action for shared files on the WBFMS 302. The command language may be specified and is the computer language in which the command of the API is transmitted from one program to another. The security parameters determine whether or not access authentication is required to access the WBA 312.

In the example of FIG. 3, the configuration interface 308 may be a web interface such as an extensible hypertext markup language (XHTML)/hypertext markup language (HTML) form wherein data can be entered.

In the example of FIG. 3, the application developer 310 may be an individual, organization, or machine acting on behalf of an individual or organization, involved in the development process of an application.

In the example of FIG. 3, the WBA 312 may be a computing device executing instructions to provide services to users through the internet. These services may, in a non-limiting example, include modifying or viewing an image file or sending a file by fax.

In the example of FIG. 3, the service information 304 may be provided by the application developer 310 through the configuration interface 308. This information may be stored on a server of the WBFMS 302. The application developer 310 may use the configuration interface 308 to provide the action information 306. This information is then stored on the WBFMS 302. To enable the WBA 312 to accept data from the WBFMS 302, the developer 310 may use the configuration interface 308 to define the commands that are sent and received to and from the WBFMS 302.

Figure 4:
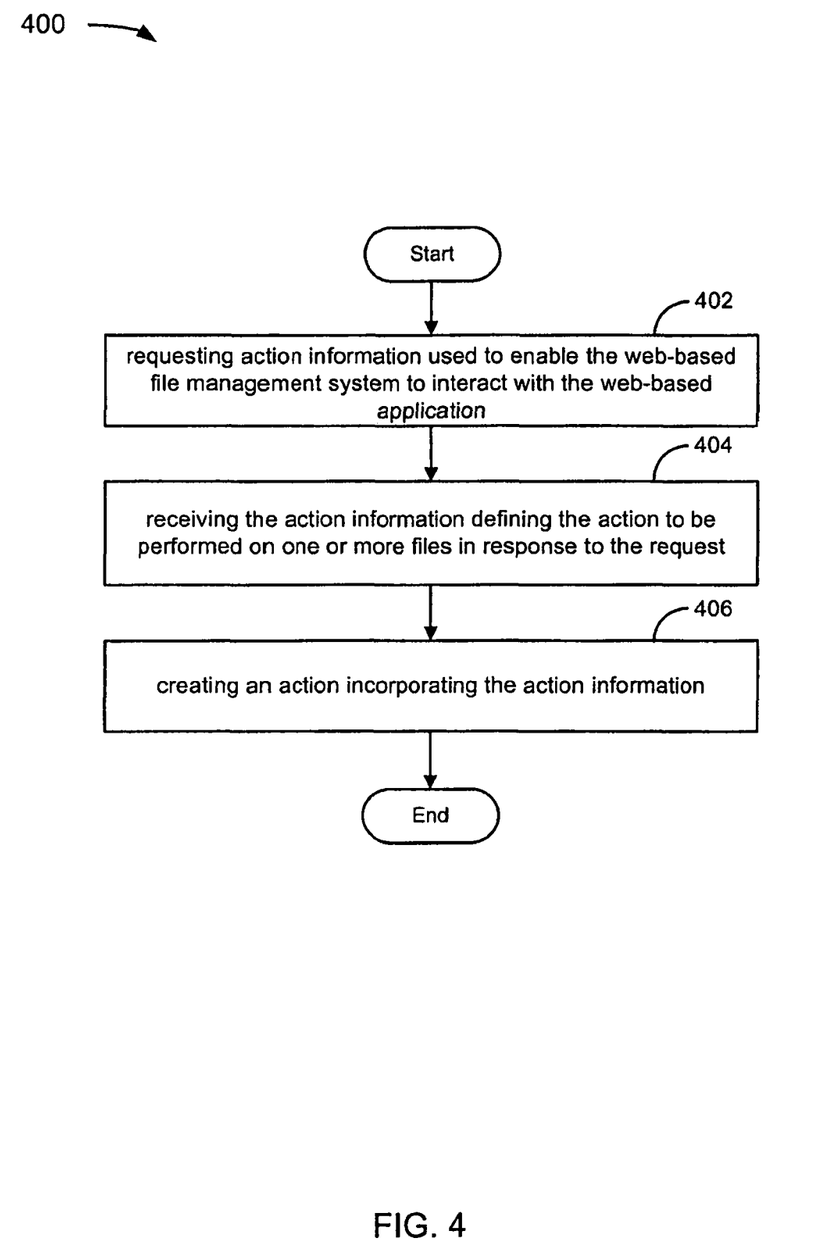
FIG. 4 depicts an example of a flowchart of a method for configuring an action enabling files stored on a web-based file management system to interact with a web-based application.

FIG. 4 depicts a flowchart 400 of an example of a method for configuring an action enabling files stored on a web-based file management system to interact with a web-based application.

In the example of FIG. 4, the flowchart starts at module 402 with requesting action information used to enable the web-based file management system to interact with the web-based application. The WBFMS may send this request to a developer of a WBA wishing to set up a service of the WBA for users of the WBFMS.

In the example of FIG. 4, the flowchart continues to module 404 with receiving the action information to be performed on one or more files in response to the request. The developer of the WBA may provide the action information, which may then be sent to the WBFMS.

In the example of FIG. 4, the flowchart continues to module 406 with creating an action incorporating the action information. This information may then be stored on the WBFMS. Having created the action, the flowchart terminates.

Figure 5:
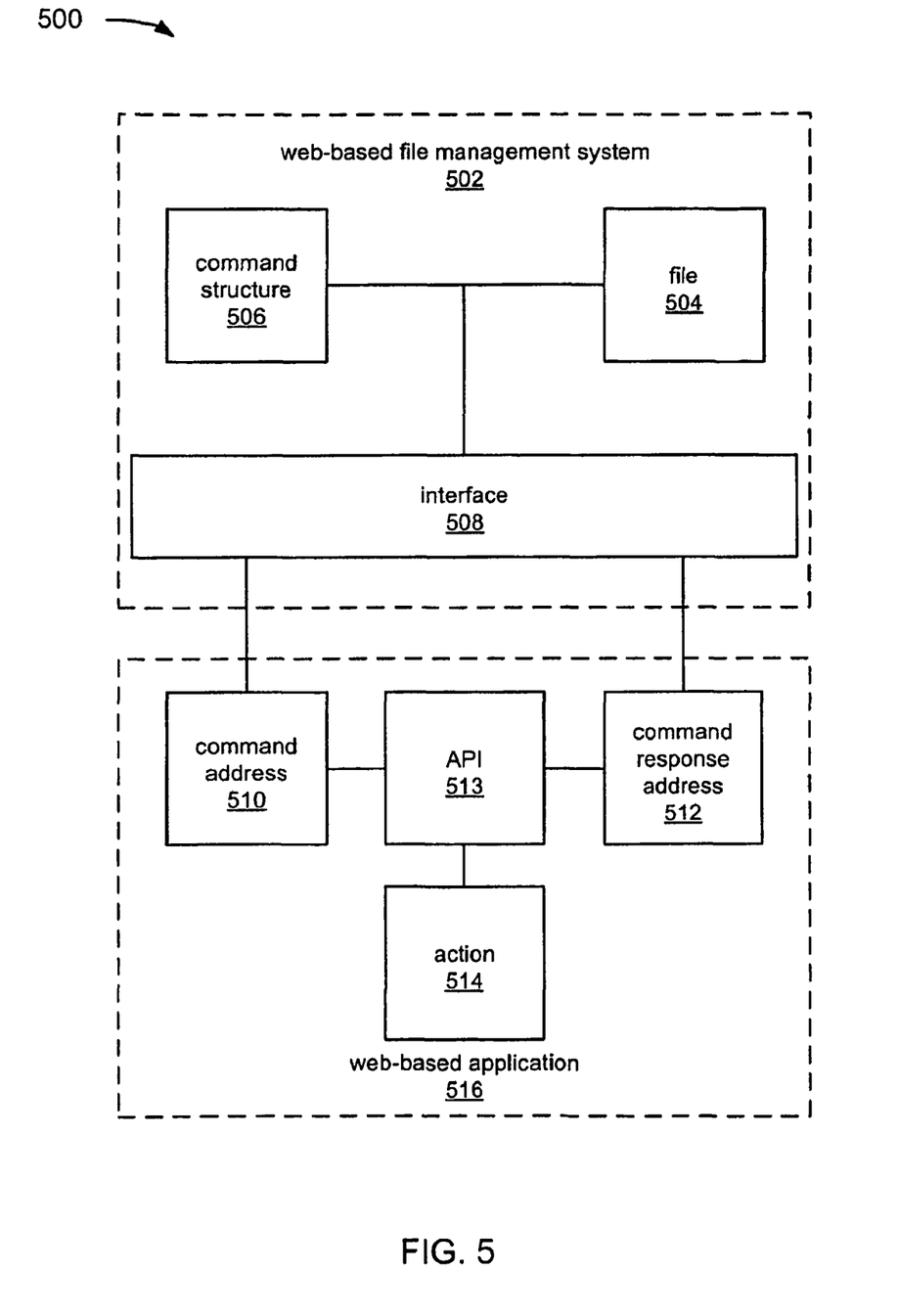
FIG. 5 depicts an example of a system for integrating a web-based file management system with an API of a web-based application.

FIG. 5 depicts a diagram 500 of an example of a method for integrating a web-based file management system with an API of a web-based application. FIG. 5 includes web-based file management system 502, and web-based application 516.

In the example of FIG. 5, web-based file management system 502 includes command structure 506, file 504 and interface 508. In the example of FIG. 5, web-based application 516 includes command address 510, command response address 512, API 513, and action 514.

In the example of FIG. 5, the command structure 506 may include code lines in the language of the API 513 of the web based application 516. The code lines can that provides the functionality described by the API 513.

In the example of FIG. 5, the file 504 may be a sequence of binary digits that can be read by a computer program, and can, in a non-limiting example, be presented to a user as, for example, text, an image, a presentation, or another known or convenient item.

In the example of FIG. 5, the interface 508 is a device that provides communication between information processing systems. The interface 508 may send data to an information processing system, and receive data from the information processing system.

In the example of FIG. 5, the command address 510 may be given by a Uniform Resource Locator (URL).

In the example of FIG. 5, the command response address 512 may be given by a Uniform Resource Locator (URL).

In the example of FIG. 5, the API 513 is an interface enabling computer programs to interact between each other. The API 513 may send commands to instruct a computer program to perform an action on a file.

In the example of FIG. 5, the action 514 may include a computer program acting on a file. In a non-limiting example, this may include modifying or displaying the file, or sending the file to another computer program.

Upon request of a user of the WBFMS 502, the WBFMS 502 sends a file 504 along with a command structure 506 to the WBA 516 through the interface 508. The specific location where the file 504 and command structure 506 are sent is given by the command address 510, and the file 504 and command structure 506 are then forwarded to the API 513. The action 514 is then applied to the file 504 using the API of the WBA 516 in accordance with the command structure 506. The file 504 may be sent back to the WBFMS 502 through the command response address 512, and stored on the WBFMS 502. The user of the WBFMS 502 may choose to either overwrite the original file when the modified file is received, or create a new file, which may be stored on the WBFMS 502. The WBFMS 502 may impose constraints on the write privileges of the user on the files.

Figure 6:
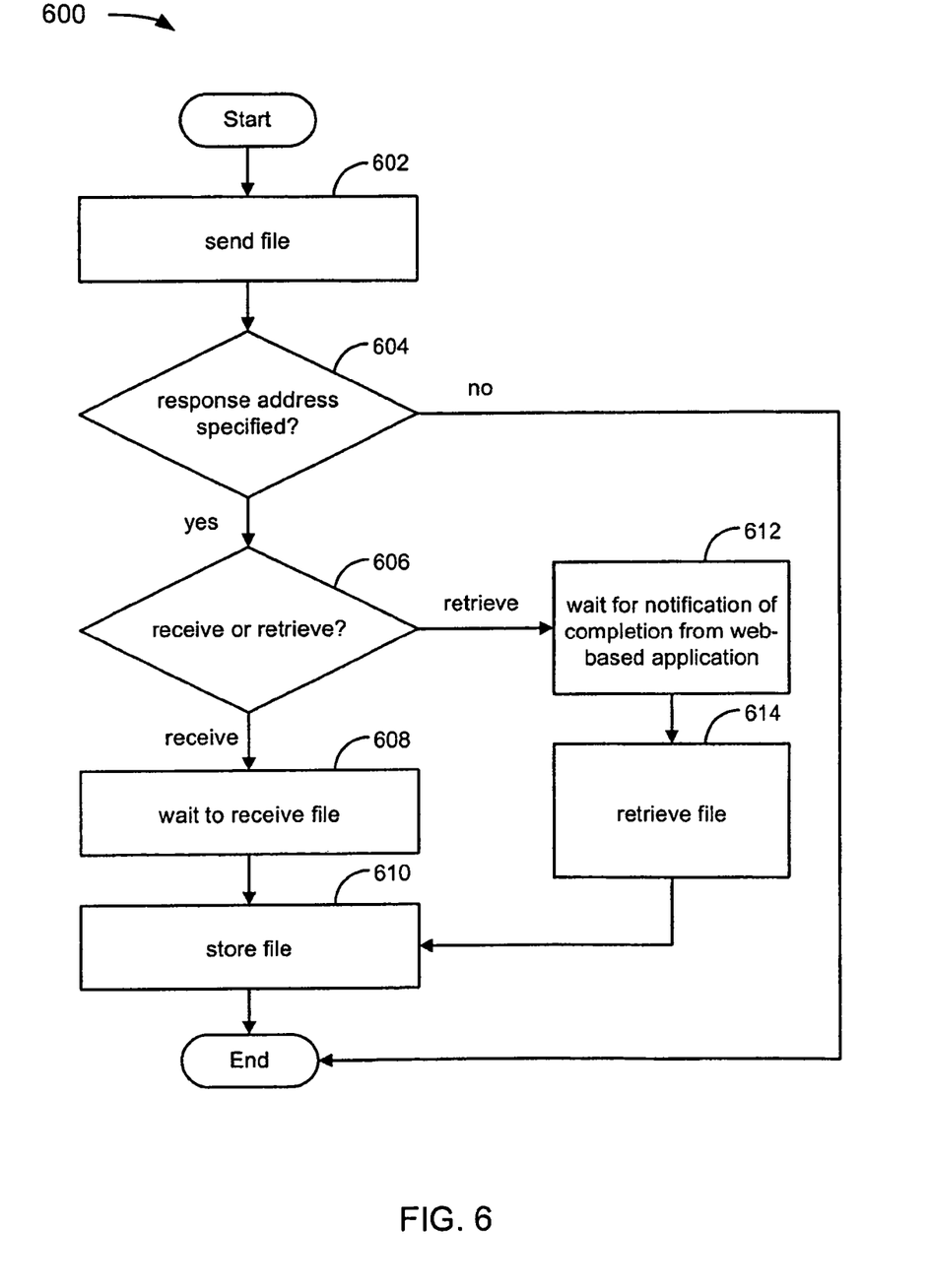
FIG. 6 depicts an example of a flowchart of a method for exchanging files between a web-based file management system and a web-based application.

FIG. 6 depicts a flowchart 600 of an example of a method for exchanging files between a web-based file management system and a web-based application.

In the example of FIG. 6, the flowchart starts at module 602 with sending a file from a WBFMS to a WBA.

In the example of FIG. 6, the flowchart continues to module 604 with determining whether a response address is specified. The response address can be specified by a developer of a WBA and can determine how the file is sent back to the WBFMS.

If the decision at module 604 is yes, then the flowchart continues to module 606 with determining whether to receive or to retrieve? The WBA may be set up to send the file back to the WBFMS upon completion of the requested action on the file. If the WBA is set up to make the file available for download upon completion of the action on the file, the WBFMS may retrieve it from the WBA.

If the decision at module 606 is receive, then the flowchart continues to module 608 with waiting to receive file. The WBFMS waits until the file has been transmitted from the WBA.

In the example of FIG. 6, the flowchart continues to module 610 with storing the file. The file may be stored by the WBFMS on any computer readable medium capable of storing data.

If the decision at module 606 is retrieve, then the flowchart continues to module 612 with waiting for notification of completion from the WBA.

In the example of FIG. 6, the flowchart continues to module 614 with retrieving the file from the WBA. The WBFMS may retrieve the file from the specified response address.

In the example of FIG. 6, the flowchart continues to module 610 with storing the file. Having stored the file on the WBFMS the flowchart terminates.

If the decision at module 604 is no, then the flowchart terminates.

Figure 7:
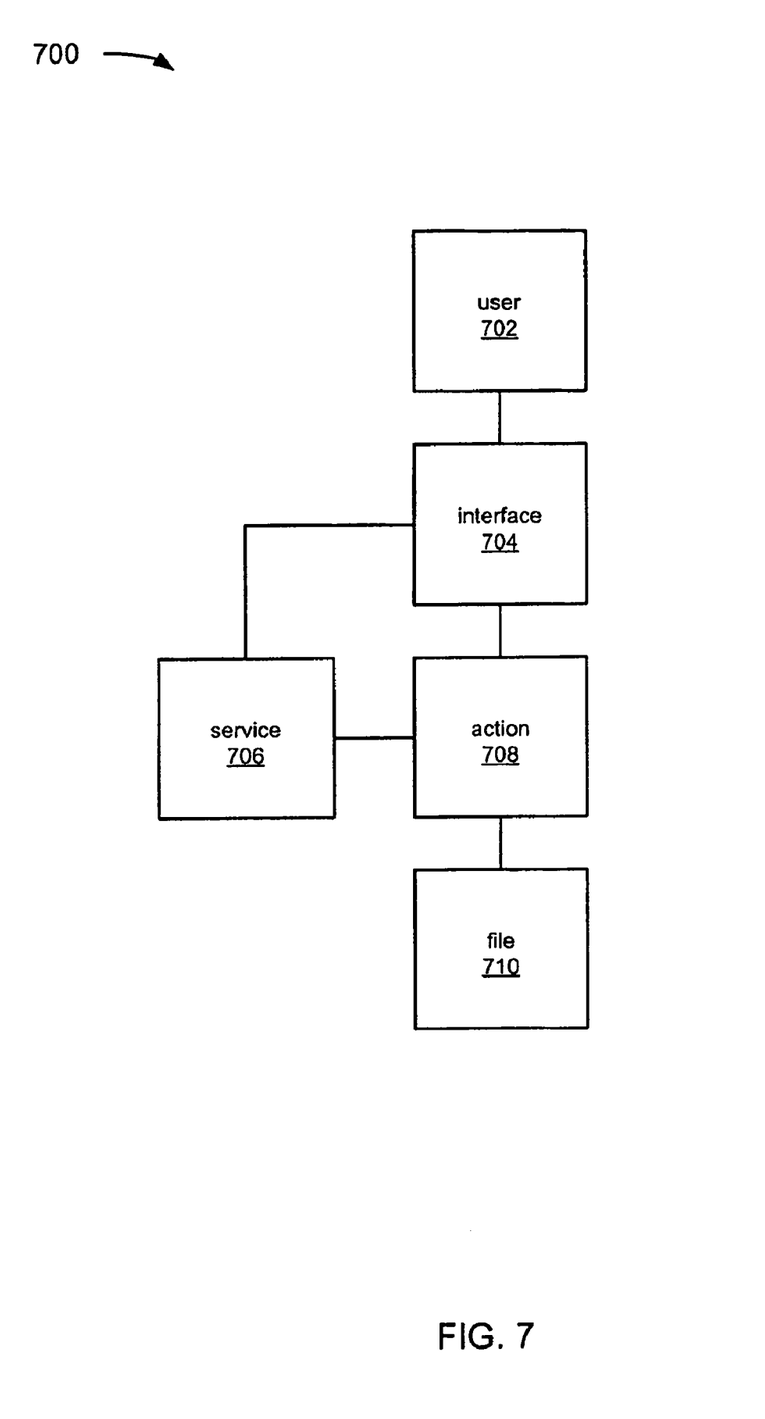
FIG. 7 depicts an example of a system for providing an action of a web-based application to one or more files of a user of a web-based file management system.

FIG. 7 depicts a diagram 700 of an example of a system for providing an action of a web-based application to one or more files of a user of a web-based file management system. FIG. 7 includes user 702, interface 704, service 706, action 708, and file 710.

In the example of FIG. 7, the user 702 may be an individual or machine acting on behalf of an individual, having access to the internet through a computing device. The user 702 may use an internet browser window, such as Internet Explorer, available from Microsoft Corporation of Redmond, Wash., or Firefox, available from Mozilla Corporation of Mountain View, Calif., to access the internet.

In the example of FIG. 7, the configuration interface 704 may be a web interface with an XHTML/HTML form wherein data can be entered.

In the example of FIG. 7, the service 706 may include information on how the service 706 will act on files. The service 706 may include more than one option to modify or display files.

In the example of FIG. 7, the action 708 may include a computer program acting on a file. In a non-limiting example, this may include modifying or displaying the file, or sending the file to another computer program.

In the example of FIG. 7, the file 710 may be a sequence of binary digits that can be read by a computer program, and can, in a non-limiting example, be presented to a user as text, image, or PowerPoint presentation.

In the example of FIG. 7, the interface 704 may include a website allowing the user 702 to access files stored on the WBFMS. The user 702 may be given the option to use the action 708, determined by the service 706, on the file 710.

In the example of FIG. 7, the user 702 may select a service and may receive a file 710, without the action 708 being requested by the user 702. An example of this would be a web-based fax service uploading received faxes to the WBFMS.

Figure 8:
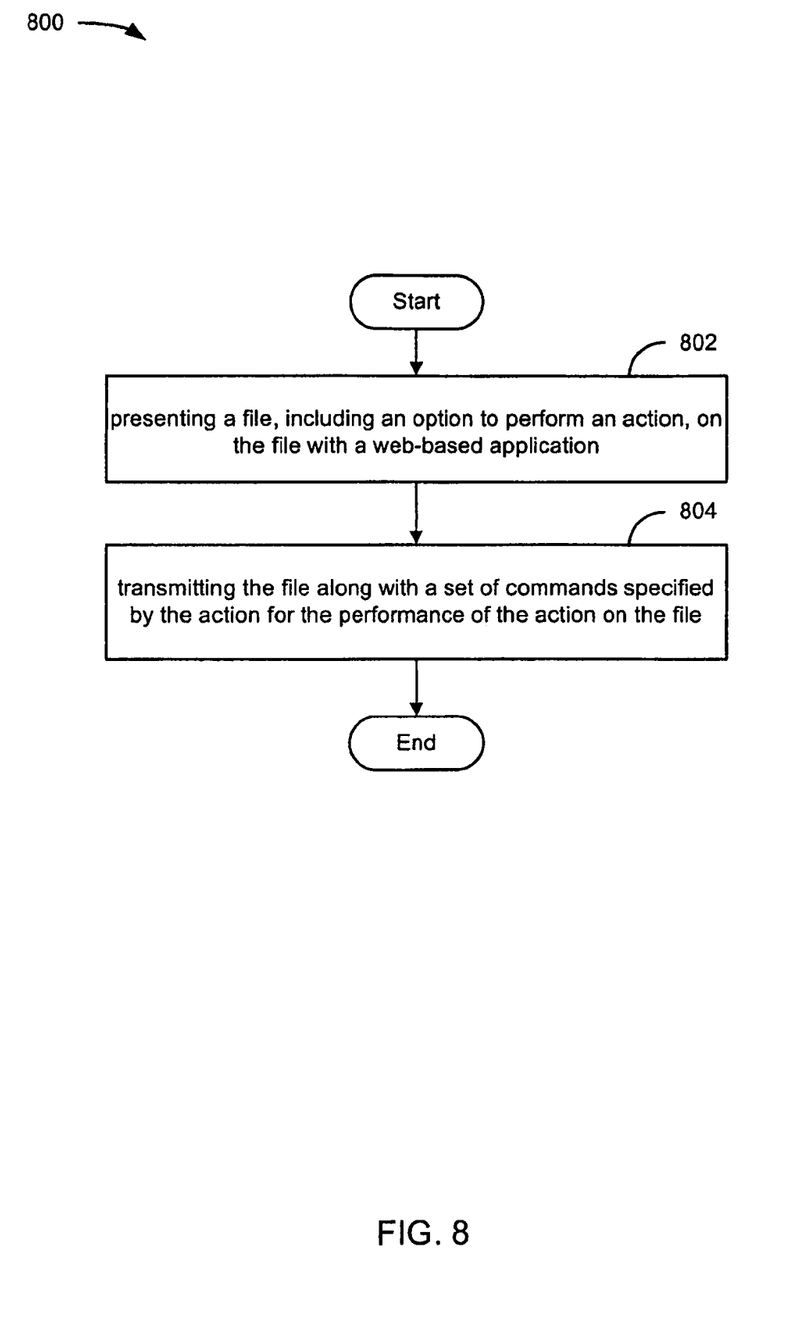
FIG. 8 depicts an example of a flowchart of a method for performing an action on a file.

FIG. 8 depicts a flowchart 800 of an example of a method for providing a user with services from a WBA.

In the example of FIG. 8, the flowchart starts at module 802 with presenting a file, including an option to perform an action on the file, with a WBA. The file may be graphically displayed to a user via, for example, a web browser. The option to perform the action could be graphically represented as a clickable, selectable, or otherwise chosen.

In the example of FIG. 8, the flowchart continues to module 804 with transmitting the file along with a set of commands specified by the action for the performance of the action on the file. The commands instruct an API of a WBA to perform an action on the file. Having transmitted the file along with a set of commands, the flowchart terminates.

Figure 9:
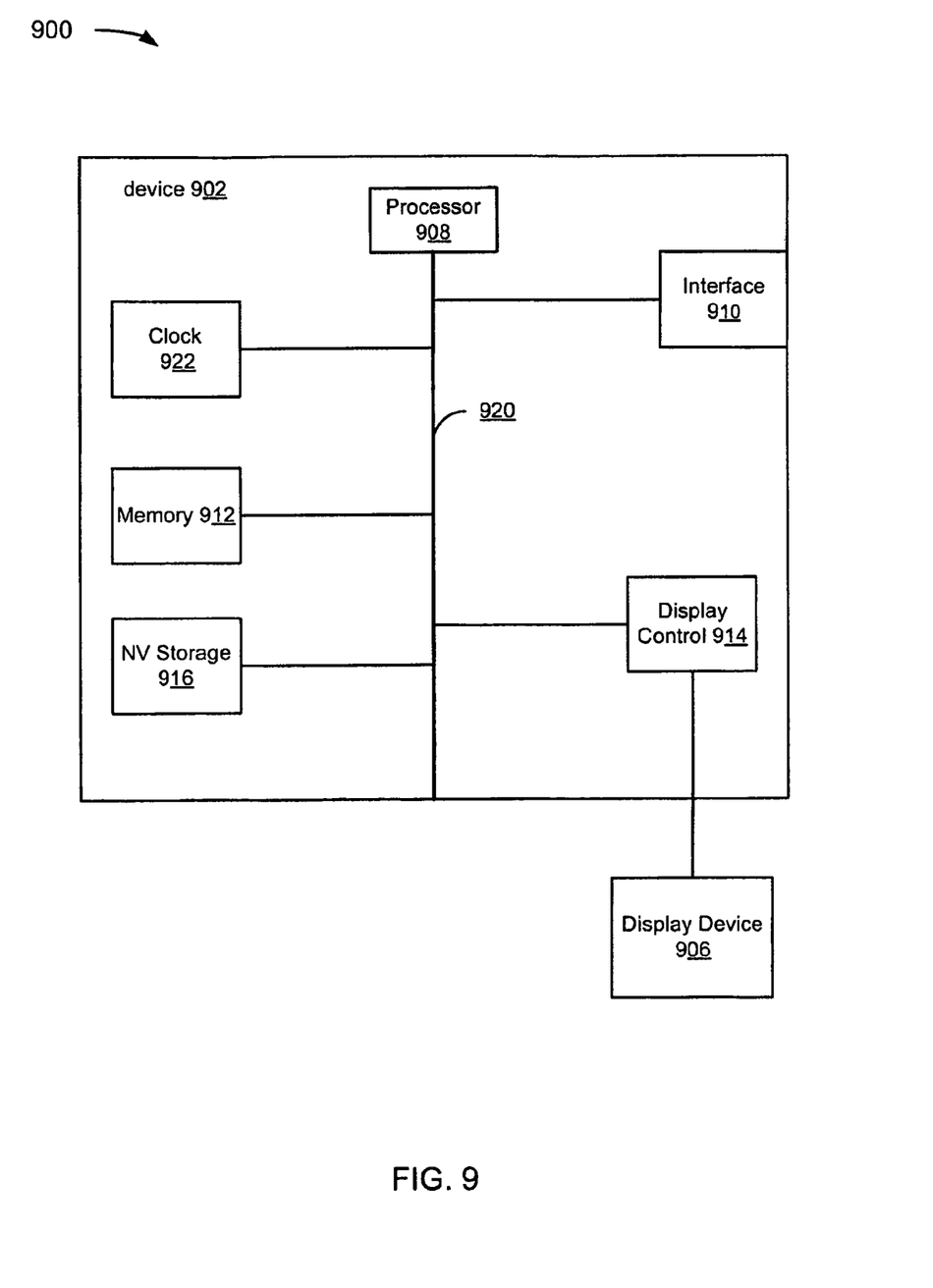
FIG. 9 depicts an example of a device for providing integration of a web-based file management system with a web-based application.

FIG. 9 depicts an example of a system 900 for integrating a web-based file management system with a web-based application through an API-agnostic method. The system 900 may be a conventional computer system that can be used as a client computer system, such as a wireless client or a workstation, or a server computer system. The system 900 includes a device 902, and a display device 906. The device 902 includes a processor 908, a communications interface 910, memory 912, display controller 914, non-volatile storage 916, clock 922. The device 902 may be coupled to or include the display device 906.

The device 902 interfaces to external systems through the communications interface 910, which may include a modem or network interface. It will be appreciated that the communications interface 910 can be considered to be part of the system 900 or a part of the device 902. The communications interface 910 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 908 may be, for example, a conventional microprocessor such as an Intel Pentium microprocessor or Motorola power PC microprocessor. The memory 912 is coupled to the processor 908 by a bus 920. The memory 912 can be Dynamic Random Access Memory (DRAM) and can also include Static RAM (SRAM). The bus 920 couples the processor 908 to the memory 912, also to the non-volatile storage 916, and to the display controller 914.

The display controller 914 may control in the conventional manner a display on the display device 906, which can be, for example, a cathode ray tube (CRT) or liquid crystal display (LCD). The display controller 914 can be implemented with conventional well known technology.

The non-volatile storage 916 is often a magnetic hard disk, flash memory, an optical disk, or another form of storage for large amounts of data. Some of this data is often written, by a direct memory access process, into memory 912 during execution of software in the device 902. One of skill in the art will immediately recognize that the terms "machine-readable medium" or "computer-readable medium" includes any type of storage device that is accessible by the processor 908.

Clock 922 can be any kind of oscillating circuit creating an electrical signal with a precise frequency. In a non-limiting example, clock 922 could be a crystal oscillator using the mechanical resonance of vibrating crystal to generate the electrical signal.

The system 900 is one example of many possible computer systems which have different architectures. For example, personal computers based on an Intel microprocessor often have multiple buses, one of which can be an I/O bus for the peripherals and one that directly connects the processor 908 and the memory 912 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 912 for execution by the processor 908. A Web TV system, which is known in the art, is also considered to be a computer system, but it may lack some of the features shown in FIG. 9, such as certain input or output devices. A typical computer system will usually include at least a processor, memory, and a bus coupling the memory to the processor.

In addition, the system 900 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 916 and causes the processor 908 to execute the various acts required by the operating system to input and output data and to store data in memory, including storing files on the non-volatile storage 916.

FIG. 10 depicts an example of a configuration interface, wherein a developer can enter values for a set of parameters to create a service.

In the example of FIG. 10, the WBFMS provides a web form, wherein the developer may enter values for well-defined parameters to create a service. Upon approval of the WBFMS, the service is made available to users of the WBFMS, and may be used with files stored on the WBFMS.

In the example of FIG. 10, the parameters may include general information, wherein the information provided by the developer may include the name of the service, a description of the service, an email address for support, a URL to a detailed description of the service, and an option to display the service in a public directory.

In the example of FIG. 10, the parameters may include the option to upload images and screenshots defining the service.

In the example of FIG. 10, the parameters may include the option to grant rights to other developers to edit the service.

In the example of FIG. 10, the parameters may include the option to create an action associated with the service.

FIG. 11 depicts an example of a configuration interface, wherein a developer can enter values for a set of parameters to create an action.

In the example of FIG. 11, the parameters may include general information about the action, including: the name of the action, a description of action, a list of extensions of supported files, permission information defining the availability of an action for shared files on the WBFMS, the category the action falls in, and status information defining whether the action is visible to (e.g., in a user searchable service directory) and executable by the users of the WBFMS.

In the example of FIG. 11, the parameters may include prompt parameters, which define what is shown to the user when the user applies an action to a file stored on the WBFMS. These parameters may include a string, a password prompt, a text area, a radio button, and a drop down menu, or any combination of the above.

In the example of FIG. 11, the developer may configure callback options. These options may include an option to run the service in a new window, the language in which the WBFMS communicates with the WBA, a URL to the command address, and a URL to the command response address.

In the example of FIG. 11, the developer may define the parameters for the commands that are sent from the WBFMS to the WBA.

In the example of FIG. 11, the developer may choose to require authentication from the user of the WBFMS when the action is requested by the user.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

What is claimed is:

1. An API-agnostic method for providing a plurality of web-based applications to a user of a web based file management system:
   providing a web based file management system which provides users web based file management services;
   providing the user of the web based file management system access to a plurality of web based applications, each web based application having a specific API;
   providing an integration engine configurable for the web-based application, the integration engine providing a file from the file management system a command prepared using a parameter; and
   providing a web based interface for configuring said integration engine by a developer entering values for the parameter;

requesting service information to define a service provided by the web based application, including: name, description, email, website for application description, access control parameters, an image to identify the service, and an API key;
receiving the service information; and
creating the service by which the action can be defined to modify the file.

2. A method for configuring a web based file management system to integrate with an application programming interface (API) of a web based application, the method comprising:
requesting action information used to enable the web based file management system to interact with the web based application, the action information including: a command address and one or more commands;
receiving the action information defining the action to be performed on one or more files in response to a request;
creating an action incorporating the action information, wherein the action sends the file and the one or more commands to the web based application via the command address in accordance with the action information;
requesting service information to define a service provided by the web based application, including: name, description, email, website for application description, access control parameters, one or more pictures to identify the service, and an API key;
receiving the service information; and
creating the service by which the action can be defined to modify one or more files.

3. The method of claim 2 wherein the action information includes one or more file types, wherein the one or more file types limit display of the action by the web based file management system to files of the one or more file types.

4. The method of claim 2 wherein the action information includes permission information determining permission requirements of the web based file management system for the action to be available for shared files.

5. The method of claim 2 wherein the action information includes status information, wherein the status information determines if the service is visible in a user searchable service directory and if it is executable.

6. The method of claim 2 further comprising a request for a response address specifying a return path for the file from the web based application to the web based file management system.

7. The method of claim 2 wherein the action information includes security parameters to provide access authentication for the web based application.

8. The method of claim 2 further comprising: operating a computing device implementing the web based file management system storing one or more files.

9. A method for integrating a web based file management system with the API of a web based application, the method comprising:
transmitting one or more files and a command structure of the API of the web based application to said web based application;
receiving one or more files from the web based application;
storing the files on a server of the web based file management system;
requesting service information to define a service provided by the web based application, including: name, description, email, website for application description, access control parameters, and an API key;
receiving the service information; and
creating the service by which the action can be defined to modify the one or more files.

10. The method of claim 9 wherein the file is retrieved from the response address of the web based application by the web based file management system.

11. The method of claim 9 wherein a command language is specified for the command structure, and the command language is selected from the group consisting of representational state transfer (REST), extensible markup language (XML), and simple object access protocol (SOAP).

12. A system for integrating a web-based file management system with a web-based application, the system comprising:
a web-based file management system (WBFMS) storing a file; and
an integration engine including a developer interfaces;
wherein a developer of a web-based application (WBA) can configure an application programmer interface (API) of the WBA to allow the WBFMS to send and receive data with the WBA in accordance with commands provided by the developer to the WBFMS to enable the WBFMS to communicate with the WBA;
wherein, the integration engine uses service information to define a service provided by the WBA, including: name, description, website for application description, access control parameters, and an API key;
creates the service by which the action can be defined to modify the file.

13. The system of claim 12 further comprising: a configuration interface operable to receive commands to configure the integration engine.

14. The system of claim 12 further comprising an action defined by the commands provided by the developer operable to cause the WBFMS to perform the action on a file stored by the WBFMS.

15. The system of claim 12 further comprising a service stored in the web WBFMA providing one or more actions under the service in accordance with the commands provided by the developer.

16. The system of claim 12 wherein an action included in the WBFMA is stored as a command structure and provided along with a file to a WBA for the performance of an action on the file by the WBA.

17. The system of claim 12 wherein the WBFMS transmits the file and the commands provided by the developer to the WBA and receives the file as modified by the WBA when the WBA has completed the action.

18. The system of claim 12 wherein the WBFMS transmits the file and the commands to the WBA and then transmits a request to the WBFMS to request the file from the WBA as modified by the WBA.

* * * * *